US010339467B2

(12) United States Patent
Blomberg et al.

(10) Patent No.: US 10,339,467 B2
(45) Date of Patent: Jul. 2, 2019

(54) QUANTITATIVE DISCOVERY OF NAME CHANGES

(71) Applicant: International Business Machines Corporation, Armonk, NY (US)

(72) Inventors: Jeanette L. Blomberg, Portola Valley, CA (US); Anca A. Chandra, Los Gatos, CA (US); Pawan R. Chowdhary, San Jose, CA (US); Se Chan Oh, Stanford, CA (US); Hovey R. Strong, Jr., San Jose, CA (US); Suppawong Tuarob, State College, PA (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 14/728,926

(22) Filed: Jun. 2, 2015

(65) Prior Publication Data

US 2016/0358097 A1   Dec. 8, 2016

(51) Int. Cl.
G06N 20/00   (2019.01)
G06Q 10/06   (2012.01)
G06F 15/18   (2006.01)

(52) U.S. Cl.
CPC ....... *G06N 20/00* (2019.01); *G06Q 10/06375* (2013.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS 5,652,842 A * 7/1997 Siegrist, Jr. ............ G06Q 40/02
345/440
5,995,924 A   11/1999 Terry
6,151,582 A * 11/2000 Huang ................... G06Q 10/06
705/7.25

(Continued)

OTHER PUBLICATIONS

List of IBM Patents or Patent Applications Treated as Related Form.
(Continued)

*Primary Examiner* — Scott A. Waldron
*Assistant Examiner* — Viker A Lamardo
(74) *Attorney, Agent, or Firm* — Sherman IP LLP; Kenneth L. Sherman; Hemavathy Perumal

(57) ABSTRACT

Embodiments of the present invention provide a method for detecting a temporal change of name associated with performance data. The method comprises receiving at least one candidate name replacement pair comprising a pair of names. The method further comprises, in a training stage, for each known name replacement pair included in the performance data, determining a window of time covering a most recent appearance of a first name of the known name replacement pair. The window of time is determined based on quantitative features of a time series model comprising performance data for the first name and a second name of the known name replacement pair. The method further comprises, in the training stage, training a machine learning classifier based on quantitative features computed using a portion of the performance data for the first name and the second name, where the portion is within the window of time determined.

20 Claims, 14 Drawing Sheets

(56) References Cited

U.S. PATENT DOCUMENTS

| | | | |
|---|---|---|---|
| 6,920,464 B2* | 7/2005 | Fox | G06Q 30/06 |
| | | | 707/732 |
| 7,194,320 B2 | 3/2007 | Lefebvre | |
| 7,236,964 B2 | 6/2007 | Labreuche | |
| 7,526,486 B2 | 4/2009 | Cushman et al. | |
| 7,765,122 B2 | 7/2010 | Shan | |
| 7,765,123 B2 | 7/2010 | Shan et al. | |
| 7,870,004 B2 | 1/2011 | Kananghinis et al. | |
| 7,885,848 B2 | 2/2011 | Kagan et al. | |
| 7,996,398 B2* | 8/2011 | Ortega | G06F 17/2725 |
| | | | 707/716 |
| 8,315,972 B2 | 11/2012 | Chkodrov et al. | |
| 8,341,008 B2 | 12/2012 | Oku | |
| 8,412,493 B2 | 4/2013 | Duchenay et al. | |
| 8,463,679 B2 | 6/2013 | Kaplan et al. | |
| 8,484,115 B2 | 7/2013 | Aymeloglu | |
| 8,615,434 B2* | 12/2013 | Benyamin | G06Q 50/01 |
| | | | 705/14.49 |
| 8,862,196 B2 | 10/2014 | Lynn | |
| 9,020,959 B2 | 4/2015 | Deng | |
| 9,898,767 B2* | 2/2018 | Psota | G06Q 50/28 |
| 2003/0163466 A1 | 8/2003 | Rajaraman et al. | |
| 2004/0117235 A1* | 6/2004 | Shacham | G06Q 10/087 |
| | | | 705/80 |
| 2004/0117290 A1* | 6/2004 | Shacham | G06Q 10/0637 |
| | | | 705/37 |
| 2005/0228707 A1 | 10/2005 | Hendrickson | |
| 2005/0278255 A1 | 12/2005 | Hahn-Carlson | |
| 2006/0009993 A1* | 1/2006 | Guo | G06Q 10/04 |
| | | | 705/7.11 |
| 2006/0184493 A1* | 8/2006 | Shiffman | G06Q 10/04 |
| | | | 706/47 |
| 2006/0271582 A1 | 11/2006 | Collins | |
| 2007/0156510 A1 | 7/2007 | Kim et al. | |
| 2008/0243660 A1 | 10/2008 | Amemiya et al. | |
| 2008/0243925 A1* | 10/2008 | Axe | G06Q 30/02 |
| 2009/0234847 A1* | 9/2009 | Homma | G01C 21/3611 |
| 2009/0248461 A1* | 10/2009 | Bartsch | G06Q 10/06 |
| | | | 705/7.27 |
| 2010/0057577 A1* | 3/2010 | Stefik | G06Q 30/02 |
| | | | 705/14.73 |
| 2010/0057773 A1* | 3/2010 | Hore | G06K 9/6221 |
| | | | 707/E17.046 |
| 2010/0138807 A1 | 6/2010 | Bogdan | |
| 2010/0218231 A1* | 8/2010 | Frink | H04N 7/17318 |
| | | | 725/118 |
| 2010/0312612 A1 | 12/2010 | Carr et al. | |
| 2011/0040636 A1* | 2/2011 | Simmons | G06Q 30/02 |
| | | | 705/14.71 |
| 2011/0060603 A1 | 3/2011 | Capelli et al. | |
| 2011/0082824 A1* | 4/2011 | Allison | G06N 99/005 |
| | | | 706/20 |
| 2011/0126206 A1 | 5/2011 | Kato et al. | |
| 2011/0231256 A1* | 9/2011 | Wang | G06Q 30/02 |
| | | | 705/14.53 |
| 2011/0231336 A1 | 9/2011 | Hu et al. | |
| 2012/0029974 A1 | 2/2012 | Councill et al. | |
| 2012/0116747 A1* | 5/2012 | Hadar | G06Q 10/00 |
| | | | 703/22 |
| 2012/0246638 A1 | 9/2012 | He et al. | |
| 2012/0284084 A1 | 11/2012 | Popkov et al. | |
| 2012/0310681 A1* | 12/2012 | Simon | G06Q 10/067 |
| | | | 705/7.11 |
| 2012/0330996 A1 | 12/2012 | Chang et al. | |
| 2013/0018830 A1 | 1/2013 | Dhurandhar | |
| 2013/0060774 A1 | 3/2013 | Shepherd et al. | |
| 2013/0060783 A1 | 3/2013 | Baum et al. | |
| 2014/0122370 A1 | 5/2014 | Jamal et al. | |
| 2014/0129325 A1* | 5/2014 | Zinger | G06Q 30/0241 |
| | | | 705/14.46 |
| 2015/0100369 A1* | 4/2015 | Blomberg | G06Q 10/06315 |
| | | | 705/7.25 |
| 2015/0379429 A1* | 12/2015 | Lee | G06N 99/005 |
| | | | 706/11 |
| 2015/0379430 A1* | 12/2015 | Dirac | G06N 99/005 |
| | | | 706/12 |

OTHER PUBLICATIONS

Himberg, J., et al., "Time series segmentation for context recognition in mobile devices", Proceedings of the 2001 IEEE International Conference on Data Mining, ICDM 2001, Nov. 29-Dec. 2, 2001, pp. 1-8, United States.

Fu, T., "A review on time series data mining", Feb. 2011, Elsevier, Engineering Applications of Artificial Intelligence, pp. 164-181, vol. 24, Issue 1, United States.

Nagpaul, P.S., "Time Series Analysis in WinIDAMS", Apr. 2005, Untied Nations Organization for Education, Science, and Culture (UNESCO), pp. 1-47 France.

Mehta, K., "Top Down or Bottom Up? Consider Hybrid", Sep. 1, 2006, Information Management, pp. 1-4, United States.

Fink, E., "Indexing of Compressed Time Series", Jan. 1, 2004, Computer Science Department, Paper 616, pp. 1-26, Carenegie Mellon University, United States.

Keogh, E. et al., "An Online Algorithm for Segmenting Time Series", Proceedings of the 2001 IEEE International Conference on Data Mining, 2001, pp. 1-46, IEEE, United States.

Kahn, K. et al., "Revisiting Top-Down Versus Bottom-Up Forecasting", The Journal of Business Forecasting, Summer 1998, pp. 14-19, United States.

Pourabbas, E. et al., "Characterization of Hierarchies and Some Operators in OLAP Environment", DOLAP '99 Proceedings the 2nd ACM International Workshop Data Warehousing OLPAP, pp. 1-17, ACM, United States.

Tsois, A. et al., "MAC: Conceptual Data Modeling for OLAP", Proceedings of the International Workshop on Design and Management of Data Warehouses (DMDW), Jun. 2001, pp. 1-11, United States.

Chen, X. et al. "Vector Symbolization Algorithm for Time Series Based on Segmentation Mode", China Academic Journal Electronic Publishing House, Feb. 2011, pp. 1-3, vol. 37, No. 4, National Knowledge Infrastructure, CNKI, China (Abstract p. 1).

Anonymous, "Smart data population in social way", Jun. 13, 2013, pp. 1-8, IP.com, United States.

Motahari Nezhad, H.R. et al., "Health Identification and Outcome Prediction for Outsourcing Services Based on Textual Comments", Proceedings of the 2014 International Conference on Services Computing (SCC), Jun. 27, 2014-Jul. 2, 2014, pp. 1-8, IEEE, United States.

Chan, Y. et al., "Hardening the EWLM Performance Data", Feb. 2006, pp. 1-52, 2nd Edition, IBM.COM/redbooks, United States.

List of IBM Patents or Patent Applications Treated As Related; Docket No. ARC920140074US02, Blomberg, J. et al., filed Mar. 27, 2019, U.S. Appl. No. 16/367,046.

\* cited by examiner

700

| Date | Amount | Cost/Rev | Country | Industry | Client | Contract | Service | Component |
|---|---|---|---|---|---|---|---|---|
| 1 | 10 | Cost | D | Banking | A Bank | A111 | S | 19a |
| 2 | 10 | Cost | D | Banking | A Bank | A111 | S | 19a |
| 3 | 20 | Cost | D | Banking | A Bank | A111 | S | 19a |
| 4 | 20 | Cost | D | Banking | A Bank | A111 | S | 19a |
| 5 | 10 | Cost | D | Banking | A Bank | A111 | S | 19a |
| 5 | 20 | Cost | D | Banking | A Bank | A111 | S | 19b |
| 6 | 40 | Cost | D | Banking | A Bank | A111 | S | 19b |
| 7 | 80 | Cost | D | Banking | A Bank | A111 | S | 19b |
| 8 | 70 | Cost | D | Banking | A Bank | A111 | S | 19b |
| 9 | 60 | Cost | D | Banking | A Bank | A111 | S | 19b |
| 10 | 40 | Cost | D | Banking | A Bank | A111 | S | 19b |
| 11 | 20 | Cost | D | Banking | A Bank | A111 | S | 19b |
| 12 | 10 | Cost | D | Banking | A Bank | A111 | S | 19b |
| 1 | 40 | Cost | D | Banking | A Bank | A112 | S | 19a |
| 2 | 20 | Cost | D | Banking | A Bank | A112 | S | 19a |
| 3 | 10 | Cost | D | Banking | A Bank | A112 | S | 19a |
| 1 | 40 | Cost | E | Banking | B Bank | B101 | S | 19a |
| 2 | 50 | Cost | E | Banking | B Bank | B101 | S | 19a |
| 3 | 60 | Cost | E | Banking | B Bank | B101 | S | 19a |
| 4 | 70 | Cost | E | Banking | B Bank | B101 | S | 19a |
| 5 | 50 | Cost | E | Banking | B Bank | B101 | S | 19a |
| 5 | 30 | Cost | E | Banking | B Bank | B101 | S | 19b |
| 6 | 30 | Cost | E | Banking | B Bank | B101 | S | 19a |
| 6 | 50 | Cost | E | Banking | B Bank | B101 | S | 19b |
| 7 | 60 | Cost | E | Banking | B Bank | B101 | S | 19b |
| 8 | 40 | Cost | E | Banking | B Bank | B101 | S | 19b |
| 9 | 20 | Cost | E | Banking | B Bank | B101 | S | 19b |
| 10 | 10 | Cost | E | Banking | C Bank | B102 | S | 19b |
| 11 | 10 | Cost | E | Banking | C Bank | B102 | S | 19b |
| 12 | 10 | Cost | E | Banking | C Bank | B102 | S | 19b |

| Date | Amount | Cost/Rev | Country | Industry | Client | Contract | Service | Component |
|---|---|---|---|---|---|---|---|---|
| 1 | 10 | * | * | * | * | A111 | * | * |
| 2 | 10 | * | * | * | * | A111 | * | * |
| 3 | 20 | * | * | * | * | A111 | * | * |
| 4 | 20 | * | * | * | * | A111 | * | * |
| 5 | 10 | * | * | * | * | A111 | * | * |
| 5 | 20 | * | * | * | * | A111 | * | * |
| 6 | 40 | * | * | * | * | A111 | * | * |
| 7 | 80 | * | * | * | * | A111 | * | * |
| 8 | 70 | * | * | * | * | A111 | * | * |
| 9 | 60 | * | * | * | * | A111 | * | * |
| 10 | 40 | * | * | * | * | A111 | * | * |
| 11 | 20 | * | * | * | * | A111 | * | * |
| 12 | 10 | * | * | * | * | A111 | * | * |

GROUP 1A

| Date | Amount | Cost/Rev | Country | Industry | Client | Contract | Service | Component |
|---|---|---|---|---|---|---|---|---|
| 1 | 40 | * | * | * | * | A112 | * | * |
| 2 | 20 | * | * | * | * | A112 | * | * |
| 3 | 10 | * | * | * | * | A112 | * | * |

GROUP 2A

| Date | Amount | Cost/Rev | Country | Industry | Client | Contract | Service | Component |
|---|---|---|---|---|---|---|---|---|
| 1 | 40 | * | * | * | * | B101 | * | * |
| 2 | 50 | * | * | * | * | B101 | * | * |
| 3 | 60 | * | * | * | * | B101 | * | * |
| 4 | 70 | * | * | * | * | B101 | * | * |
| 5 | 50 | * | * | * | * | B101 | * | * |
| 5 | 30 | * | * | * | * | B101 | * | * |
| 6 | 30 | * | * | * | * | B101 | * | * |
| 6 | 50 | * | * | * | * | B101 | * | * |
| 7 | 60 | * | * | * | * | B101 | * | * |
| 8 | 40 | * | * | * | * | B101 | * | * |
| 9 | 20 | * | * | * | * | B101 | * | * |

GROUP 3A

| Date | Amount | Cost/Rev | Country | Industry | Client | Contract | Service | Component |
|---|---|---|---|---|---|---|---|---|
| 10 | 10 | * | * | * | * | B102 | * | * |
| 11 | 10 | * | * | * | * | B102 | * | * |
| 12 | 10 | * | * | * | * | B102 | * | * |

GROUP 4A

| Date | Amount | Cost/Rev | Country | Industry | Client | Contract | Service | Component |
|------|--------|----------|---------|----------|--------|----------|---------|-----------|
| 1 | 10 | * | * | * | * | A111 | * | 19a |
| 2 | 10 | * | * | * | * | A111 | * | 19a |
| 3 | 20 | * | * | * | * | A111 | * | 19a |
| 4 | 20 | * | * | * | * | A111 | * | 19a |
| 5 | 10 | * | * | * | * | A111 | * | 19a |

} GROUP 1B

| Date | Amount | Cost/Rev | Country | Industry | Client | Contract | Service | Component |
|------|--------|----------|---------|----------|--------|----------|---------|-----------|
| 5 | 20 | * | * | * | * | A111 | * | 19b |
| 6 | 40 | * | * | * | * | A111 | * | 19b |
| 7 | 80 | * | * | * | * | A111 | * | 19b |
| 8 | 70 | * | * | * | * | A111 | * | 19b |
| 9 | 60 | * | * | * | * | A111 | * | 19b |
| 10 | 40 | * | * | * | * | A111 | * | 19b |
| 11 | 20 | * | * | * | * | A111 | * | 19b |
| 12 | 10 | * | * | * | * | A111 | * | 19b |

} GROUP 2B

| Date | Amount | Cost/Rev | Country | Industry | Client | Contract | Service | Component |
|------|--------|----------|---------|----------|--------|----------|---------|-----------|
| 1 | 40 | * | * | * | * | A112 | * | 19a |
| 2 | 20 | * | * | * | * | A112 | * | 19a |
| 3 | 10 | * | * | * | * | A112 | * | 19a |

} GROUP 3B

| Date | Amount | Cost/Rev | Country | Industry | Client | Contract | Service | Component |
|------|--------|----------|---------|----------|--------|----------|---------|-----------|
| 1 | 40 | * | * | * | * | B101 | * | 19a |
| 2 | 50 | * | * | * | * | B101 | * | 19a |
| 3 | 60 | * | * | * | * | B101 | * | 19a |
| 4 | 70 | * | * | * | * | B101 | * | 19a |
| 5 | 50 | * | * | * | * | B101 | * | 19a |
| 6 | 30 | * | * | * | * | B101 | * | 19a |

} GROUP 4B

| Date | Amount | Cost/Rev | Country | Industry | Client | Contract | Service | Component |
|------|--------|----------|---------|----------|--------|----------|---------|-----------|
| 5 | 30 | * | * | * | * | B101 | * | 19b |
| 6 | 50 | * | * | * | * | B101 | * | 19b |
| 7 | 60 | * | * | * | * | B101 | * | 19b |
| 8 | 40 | * | * | * | * | B101 | * | 19b |
| 9 | 20 | * | * | * | * | B101 | * | 19b |

} GROUP 5B

| Date | Amount | Cost/Rev | Country | Industry | Client | Contract | Service | Component |
|------|--------|----------|---------|----------|--------|----------|---------|-----------|
| 1 | 50 | * | D | * | * | * | * | 19a |
| 2 | 30 | * | D | * | * | * | * | 19a |
| 3 | 30 | * | D | * | * | * | * | 19a |
| 4 | 20 | * | D | * | * | * | * | 19a |
| 5 | 10 | * | D | * | * | * | * | 19a |

} GROUP 1C

| Date | Amount | Cost/Rev | Country | Industry | Client | Contract | Service | Component |
|------|--------|----------|---------|----------|--------|----------|---------|-----------|
| 5 | 20 | * | D | * | * | * | * | 19b |
| 6 | 40 | * | D | * | * | * | * | 19b |
| 7 | 80 | * | D | * | * | * | * | 19b |
| 8 | 70 | * | D | * | * | * | * | 19b |
| 9 | 60 | * | D | * | * | * | * | 19b |
| 10 | 40 | * | D | * | * | * | * | 19b |
| 11 | 20 | * | D | * | * | * | * | 19b |
| 12 | 10 | * | D | * | * | * | * | 19b |

} GROUP 2C

| Date | Amount | Cost/Rev | Country | Industry | Client | Contract | Service | Component |
|------|--------|----------|---------|----------|--------|----------|---------|-----------|
| 1 | 40 | * | E | * | * | * | * | 19a |
| 2 | 50 | * | E | * | * | * | * | 19a |
| 3 | 60 | * | E | * | * | * | * | 19a |
| 4 | 70 | * | E | * | * | * | * | 19a |
| 5 | 50 | * | E | * | * | * | * | 19a |
| 6 | 30 | * | E | * | * | * | * | 19a |

} GROUP 3C

| Date | Amount | Cost/Rev | Country | Industry | Client | Contract | Service | Component |
|------|--------|----------|---------|----------|--------|----------|---------|-----------|
| 5 | 30 | * | E | * | * | * | * | 19b |
| 6 | 50 | * | E | * | * | * | * | 19b |
| 7 | 60 | * | E | * | * | * | * | 19b |
| 8 | 40 | * | E | * | * | * | * | 19b |
| 9 | 20 | * | E | * | * | * | * | 19b |

} GROUP 4C

FIG. 5D

QUANTITATIVE DISCOVERY OF NAME CHANGES

The present invention generally relates to detecting data changes associated with service delivery, and more particularly, to a system, method and computer program product for quantitative discovery of name changes.

BACKGROUND

A service provider offers services (e.g., Information Technology services) to customers. A service delivery engagement involves the delivery of services offered. A service delivery engagement may be complex. For example, the delivery of services may span many years (e.g., a multi-year service delivery project). As another example, the delivery of services may involve delivery and/or customer locations in multiple countries (e.g., a multi-country service delivery project). Modeling cost estimations for a service delivery engagement is based on multiple variables, such as socio-economic conditions of delivery and/or customer locations, demand for services offered, infrastructure needed to support the services offered, etc.

SUMMARY

One embodiment of the invention provides a method for detecting a temporal change of name associated with performance data. The method comprises receiving at least one candidate name replacement pair. Each name replacement candidate pair comprises a pair of names. The method further comprises, in a training stage, for each known name replacement pair included in the performance data, determining a window of time for the known replacement pair that covers a most recent appearance of a first name of the known name replacement pair. The window of time is determined based on quantitative features of a time series model comprising performance data for the first name and a second name of the known name replacement pair. The method further comprises, in the training stage, training a machine learning classifier based on quantitative features computed using a portion of the performance data for the first name and the second name of the known name replacement pair, where the portion is within the window of time determined for the known replacement pair.

Another embodiment of the invention provides a system comprising a memory having computer readable computer instructions, and a processor for executing the computer readable instructions. The instructions include receiving at least one candidate name replacement pair. Each name replacement candidate pair comprises a pair of names. The method further comprises, in a training stage, for each known name replacement pair included in the performance data, determining a window of time for the known replacement pair that covers a most recent appearance of a first name of the known name replacement pair. The window of time is determined based on quantitative features of a time series model comprising performance data for the first name and a second name of the known name replacement pair. The method further comprises, in the training stage, training a machine learning classifier based on quantitative features computed using a portion of the performance data for the first name and the second name of the known name replacement pair, where the portion is within the window of time determined for the known replacement pair.

Another embodiment of the invention provides a computer program product comprising a computer readable storage medium having program code embodied therewith. The program code is executable by a processor to receive at least one candidate name replacement pair. Each name replacement candidate pair comprises a pair of names. The program code is further executable by the processor to, in a training stage, for each known name replacement pair included in the performance data, determine a window of time for the known replacement pair that covers a most recent appearance of a first name of the known name replacement pair. The window of time is determined based on quantitative features of a time series model comprising performance data for the first name and a second name of the known name replacement pair. The program code is further executable by the processor to, in the training stage, train a machine learning classifier based on quantitative features computed using a portion of the performance data for the first name and the second name of the known name replacement pair, where the portion is within the window of time determined for the known replacement pair.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5A illustrates a first example schema for a service delivery project;

FIG. 5B illustrates a second example schema for a service delivery project;

FIG. 5C illustrates a third example schema for a service delivery project;

FIG. 5D illustrates a fourth example schema for a service delivery project;

Figure 1:
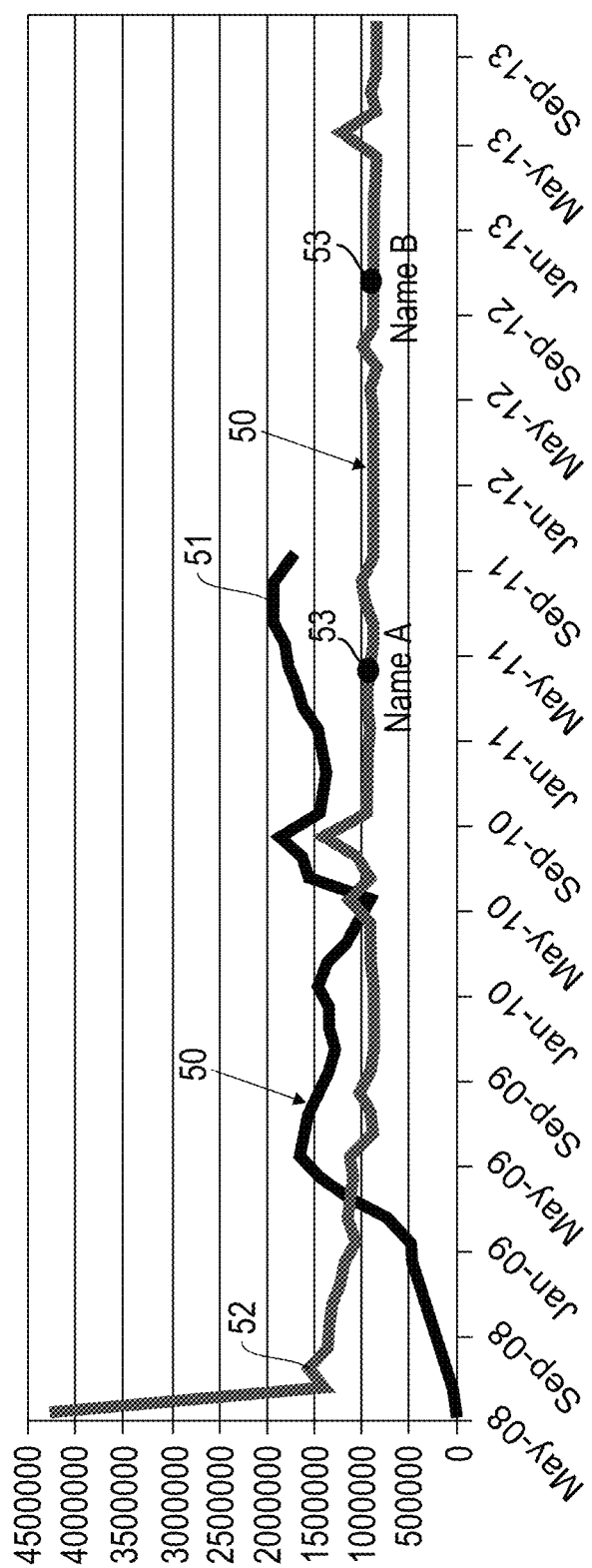
FIG. 1 illustrates two example graphs.

The detailed description explains the preferred embodiments of the invention, together with advantages and features, by way of example with reference to the drawings.

DETAILED DESCRIPTION

Embodiments of the present invention provide a method for detecting a temporal change of name associated with performance data. The method comprises receiving at least one candidate name replacement pair. Each name replacement candidate pair comprises a pair of names. The method further comprises, in a training stage, for each known name replacement pair included in the performance data, determining a window of time for the known replacement pair that covers a most recent appearance of a first name of the known name replacement pair. The window of time is determined based on quantitative features of a time series model comprising performance data for both the first name and a second name of the known name replacement pair. The method further comprises, in the training stage, training a machine learning classifier based on quantitative features computed using a portion of the performance data for both the first name and the second name of the known name replacement pair, where the portion is within the window of time determined for the known replacement pair.

Another embodiment of the invention provides a system comprising a memory having computer readable computer instructions, and a processor for executing the computer readable instructions. The instructions include receiving at least one candidate name replacement pair. Each name replacement candidate pair comprises a pair of names. The method further comprises, in a training stage, for each known name replacement pair included in the performance data, determining a window of time for the known replacement pair that covers a most recent appearance of a first name of the known name replacement pair. The window of time is determined based on quantitative features of a time series model comprising performance data for the first name and a second name of the known name replacement pair. The method further comprises, in the training stage, training a machine learning classifier based on quantitative features computed using a portion of the performance data for the first name and the second name of the known name replacement pair, where the portion is within the window of time determined for the known replacement pair.

Another embodiment of the invention provides a computer program product comprising a computer readable storage medium having program code embodied therewith. The program code is executable by a processor to receive at least one candidate name replacement pair. Each name replacement candidate pair comprises a pair of names. The program code is further executable by the processor to, in a training stage, for each known name replacement pair included in the performance data, determine a window of time for the known replacement pair that covers a most recent appearance of a first name of the known name replacement pair. The window of time is determined based on quantitative features of a time series model comprising performance data for the first name and a second name of the known name replacement pair. The program code is further executable by the processor to, in the training stage, train a machine learning classifier based on quantitative features computed using a portion of the performance data for the first name and the second name of the known name replacement pair, where the portion is within the window of time determined for the known replacement pair.

FIG. 1 illustrates two example graphs 51, 52. Each graph 51, 52 is a time series model 50. Typically, a time series model 50 comprises a sequence of objects as a function of time. Each object has a corresponding data value, a corresponding time stamp and at least one corresponding descriptor/tag 53 comprising text (e.g., taxonomic classification) describing the object. A data value of an object may be a numeric data value (e.g., costs, profits, revenue) or a non-numeric data value.

In this specification, let the term "name" denote a descriptor/tag 53 associated with an object, and let the term "name change" denote a temporal change of name (i.e., a change to a descriptor/tag 53 associated with objects over time). A name change need not affect behavior of objects (i.e., the objects operate/function the same way); the name change may represent, instead, a change to what the objects are called. For example, as illustrated in FIG. 1, a tag 53 associated with objects of graph 52 may change from "Name A" to "Name B" over time.

Embodiments of the invention are directed towards automatic quantitative discovery of name changes associated with data. Embodiments of the invention are applicable to any type of data, and may be used in preparation of data before application of machine learning techniques. In one embodiment, embodiments of the invention are applicable to service delivery performance data. Embodiments of the invention are also applicable to other types of time series data.

Performance data associated with a service delivery project may be recorded with various taxonomic classifications. In this specification, the term "name" is used to denote a taxonomic classification. Business processes sometimes result in changes to a name during service delivery. Examples include changes to an offering category and changes to a contract number (e.g., by replacement). To construct long running models of service delivery performance from historical data, these name changes must be detected so that data associated with a name replacement may be viewed as a continuation instead of a beginning/start. Conventional quantitative solutions involve comparing average performance before and after a possible instance of a name change, where averages are taken over all relevant data for the two names, or over data from a fixed duration window.

In this specification, let the term "contract identifier" denote a name associated with performance data. If actual data indicates that a first contract with a first contract identifier has been replaced by a second contract with a second contract identifier, the first contract identifier and the second contract identifier form a pair of names representing a known name change.

Figure 2:
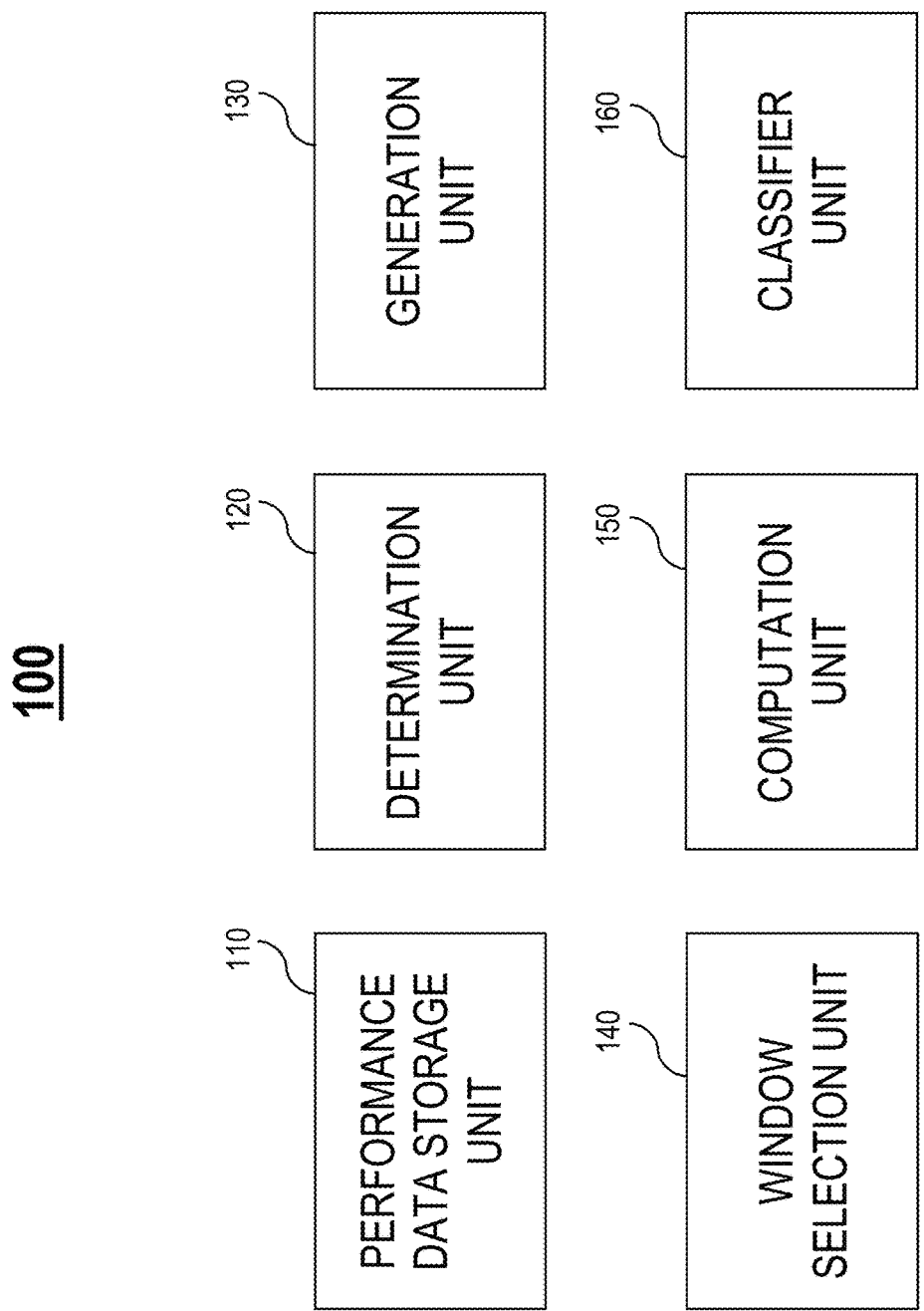
FIG. 2 illustrates an example system for automatic quantitative discovery of name changes associated with data, in accordance with an embodiment of the invention.
Figure 7:
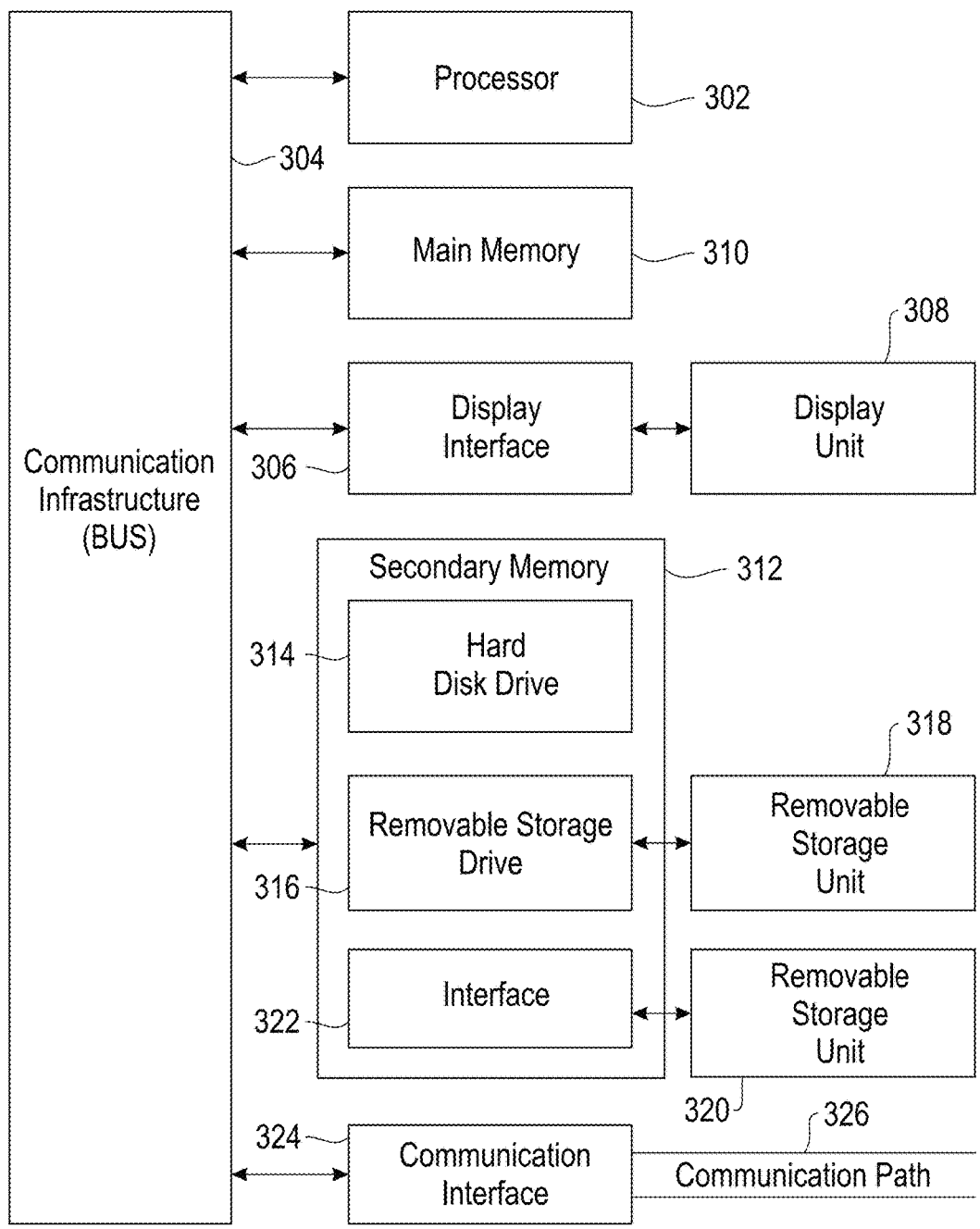
FIG. 7 is a high level block diagram showing an information processing system useful for implementing an embodiment of the present invention.

FIG. 2 illustrates an example system 100 for automatic quantitative discovery of name changes associated with data, in accordance with an embodiment of the invention. The system 100 comprises multiple specialized components directed towards automatic quantitative discovery of name changes associated with data, a concept inextricably tied to computer technology. For example, in one embodiment, the system 100 comprises a performance data storage unit 110, a determination unit 120, a generation unit 130, a window selection unit 140, a computation unit 150 and a classifier unit 160. One or more of the components of the system 100 are executable on one or more hardware processors 302 (FIG. 7).

The performance data storage unit 110 is configured for maintaining historical performance data representing actual data. In one embodiment, some of the actual data maintained in the data storage unit 110 may be represented as one or more time series models 50, where each time series model 50 comprises a sequence of objects (e.g., actual costs) associated with a service delivery project. Each object (i.e., datum) maintained in the data storage unit 110 has a corresponding timestamp (e.g., date), a corresponding data value, and a corresponding name. In one embodiment, the performance data storage unit 110 resides on one or more server databases.

In this specification, let the terms "before name" and "after name" denote a first name and a second name, respectively, that appear in actual data and are associated with a name change, where the first name is replaced by the second name over time. In this specification, let the term "name replacement pair" denote a pair of names associated with a name change, where the pair comprises a before name and an after name. A name replacement pair may be either a known name replacement pair (e.g., a known name change based on actual data) or a candidate/synthetic name replacement pair (e.g., a predicted name change determined based on known name changes and/or actual data).

Let p denote a name replacement pair, let $g_b$ denote a before name, and let $g_a$ denote an after name. A name replacement pair p may be expressed in accordance with equation (1) provided below:

$$p = <g_b, g_a> \quad (1).$$

The determination unit 120 is configured for determining candidate name replacement pairs based on performance data maintained by the performance data storage unit 110. In one embodiment, each candidate name replacement pair determined must satisfy a temporal constraint.

Figure 3A:
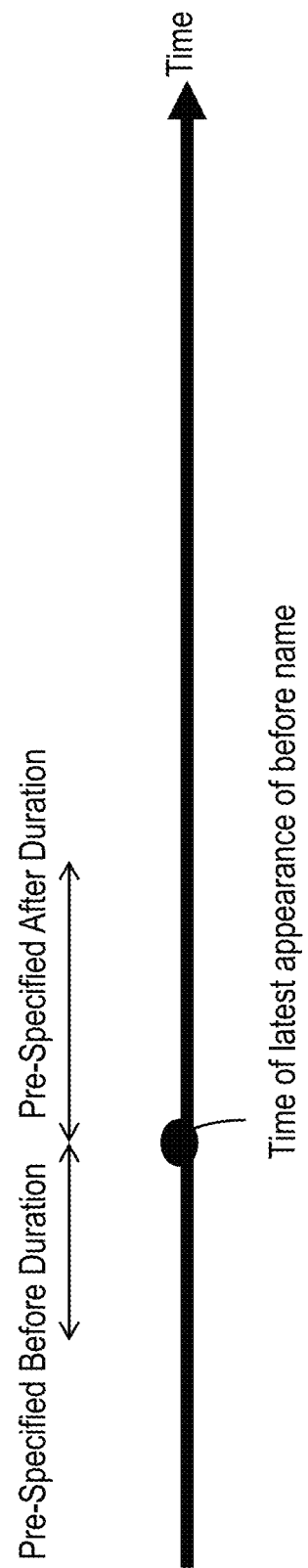
FIG. 3A illustrates an example two-sided temporal constraint that each candidate name replacement pair must satisfy, in accordance with an embodiment of the invention.

FIG. 3A illustrates an example two-sided temporal constraint that each candidate name replacement pair must satisfy, in accordance with an embodiment of the invention. In one embodiment, each candidate name replacement pair determined must satisfy the following conditions: 1) time of earliest appearance of the after name is before time of latest appearance of the before name plus a pre-specified after duration, and 2) time of earliest appearance of the after name is after time of latest appearance of the before name minus a pre-specified before duration.

A name replacement pair may be classified as either a positive example of a name replacement or a negative example of a name replacement. A name replacement pair p is classified as a positive example of a name replacement if $g_a$ is the replacement name for $g_b$. A candidate name replacement pair p is classified as a negative example of a name replacement if $g_a$ is not the replacement name for $g_b$.

Referring back to FIG. 2, the generation unit 130 is configured for generating positive and/or negative synthetic examples of name replacements (i.e., positive and/or negative candidate name replacement pairs). In one embodiment, the generation unit 130 obtains a sample of known name replacement pairs, and generates positive and/or negative synthetic examples based on the known name replacement pairs obtained. Known name replacement pairs may arise from partial name changes for which there is high confidence of a name replacement or from expert response to questions. In one embodiment, known name replacement pairs may be obtained from actual data maintained in the performance data storage unit 110.

In one embodiment, the generation unit 130 may generate any number of positive synthetic examples of name replacements at any level of data aggregation (e.g., contract, country) by selecting a time series model for one name and selecting a random time interior to the selected time series model for a pretended name change.

Figure 4:
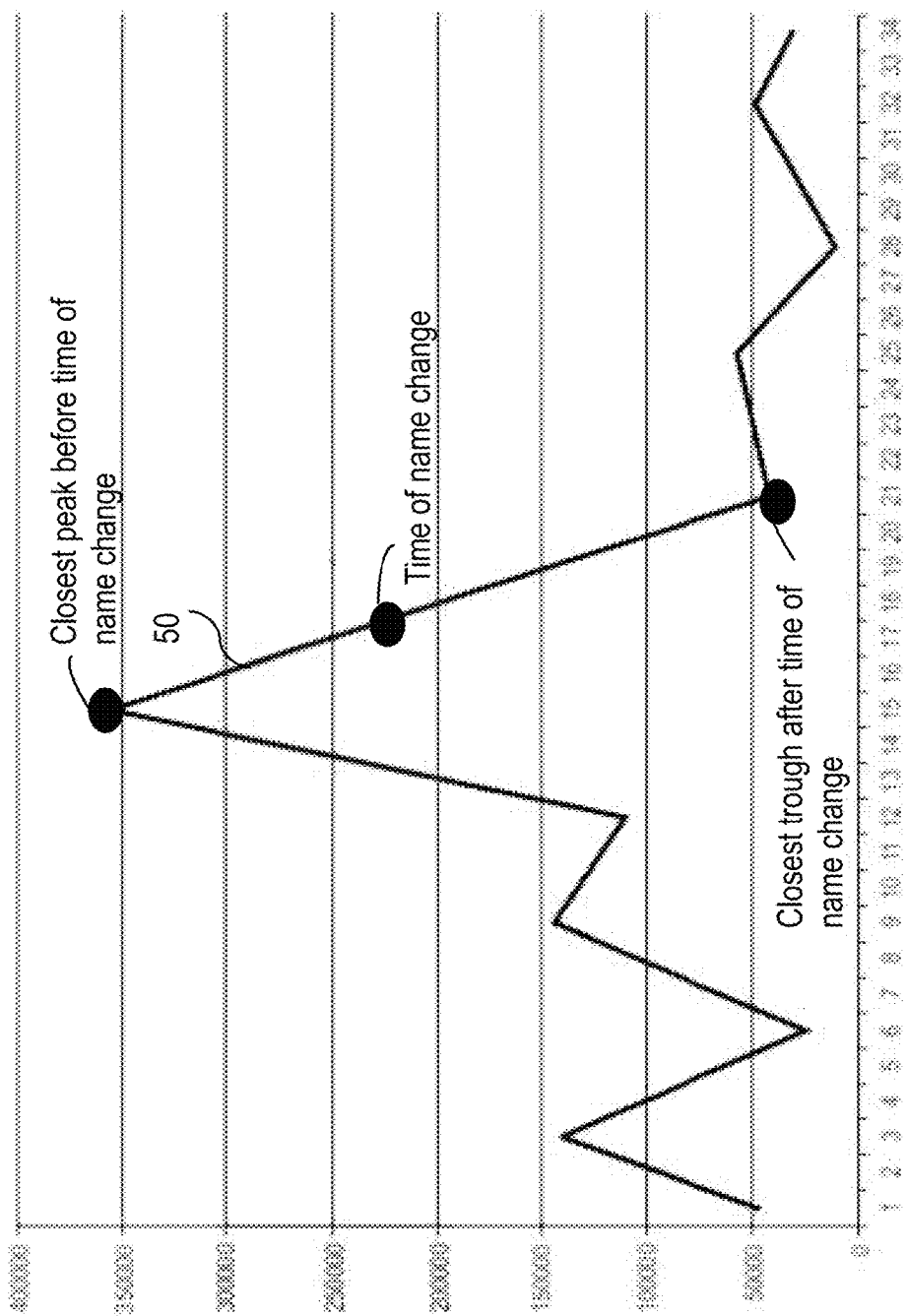
FIG. 4 illustrates an example window selecting feature and/or method, in accordance with an embodiment of the invention.

For example, if the example time series model 50 shown in FIG. 4. is for a single name only, the generation unit 130 generates a positive synthetic example of a name replacement by selecting a random time interior to the time series model 50 for a pretended name change. Specifically, the generation unit 130 randomly selects a point of the time series model 50 as a point associated with the pretended name change, and provides a candidate name replacement pair classified as a positive synthetic example of a name replacement. The candidate name replacement pair includes a before name that covers a portion of the time series model 50 including the selected point and points occurring before the selected point, and an after name that covers a remaining portion of the time series model 50 including points occurring after the selected point.

Figure 3B:
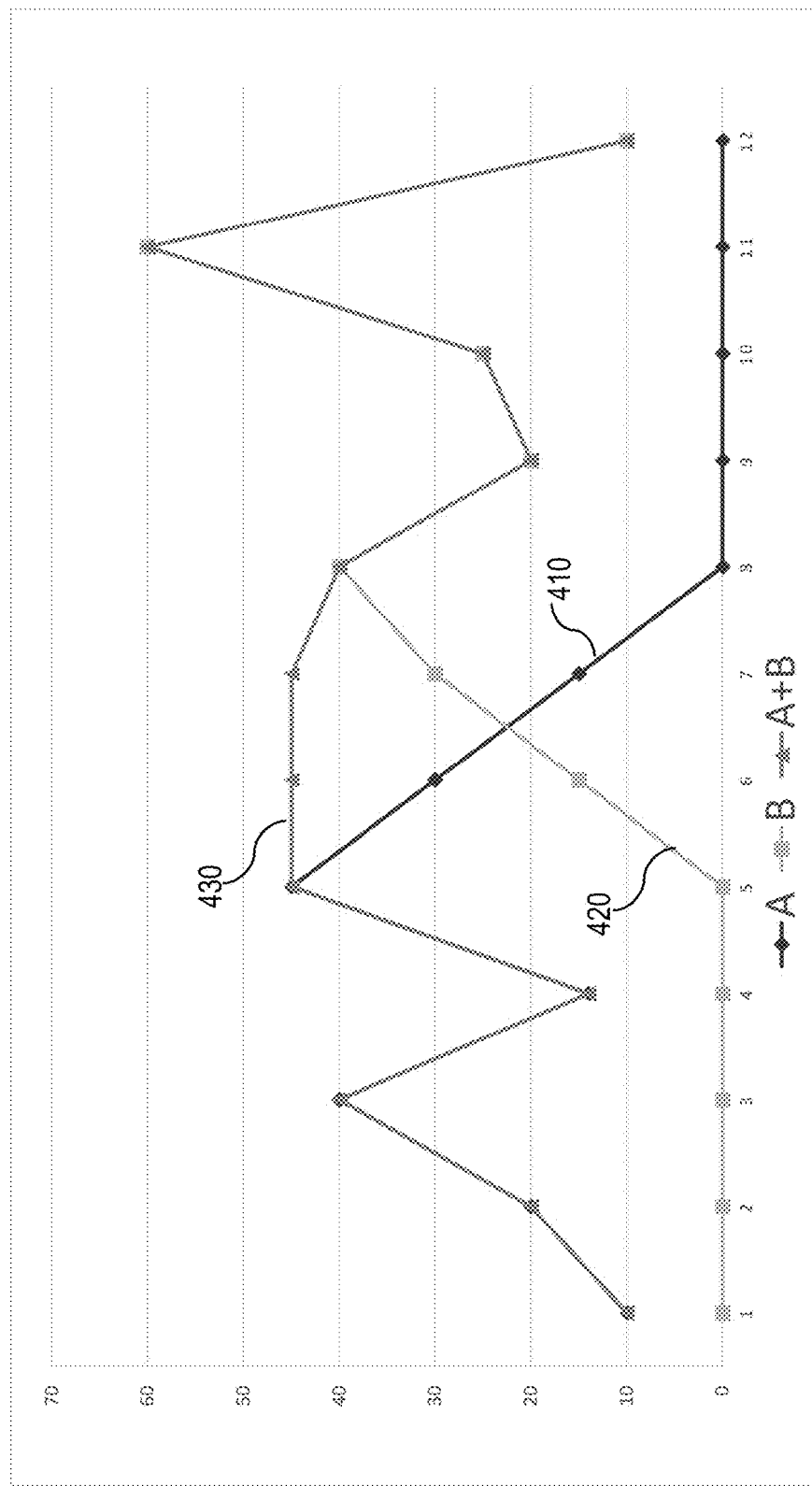
FIG. 3B illustrates a first example graph comprising known examples used for determining a positive example of a name replacement, in accordance with an embodiment of the invention.

FIG. 3B illustrates a first example graph 400 comprising known examples used for determining a positive example of a name replacement, in accordance with an embodiment of the invention. The graph 400 includes a first example time series model 410 for a single name "A", and a second example time series model 420 for a single name "B". Each time series model 410, 420 represents a known example. A time series model 430 representing a sum of the time series models 410 and 420 is also included in the graph 400.

As shown in FIG. 3B, the name "A" is known to be replaced with the name "B" over time, such that the first time series model 410 and the second time series model 420 represent a before time series model and an after time series model, respectively. Based on the time series models 410, 420, the generation unit 130 generates a candidate name replacement pair <"A", "B">, where "A" is the before name, and "B" is the after name. The candidate name replacement pair <"A", "B"> is a positive known example of a name replacement.

Figure 3C:
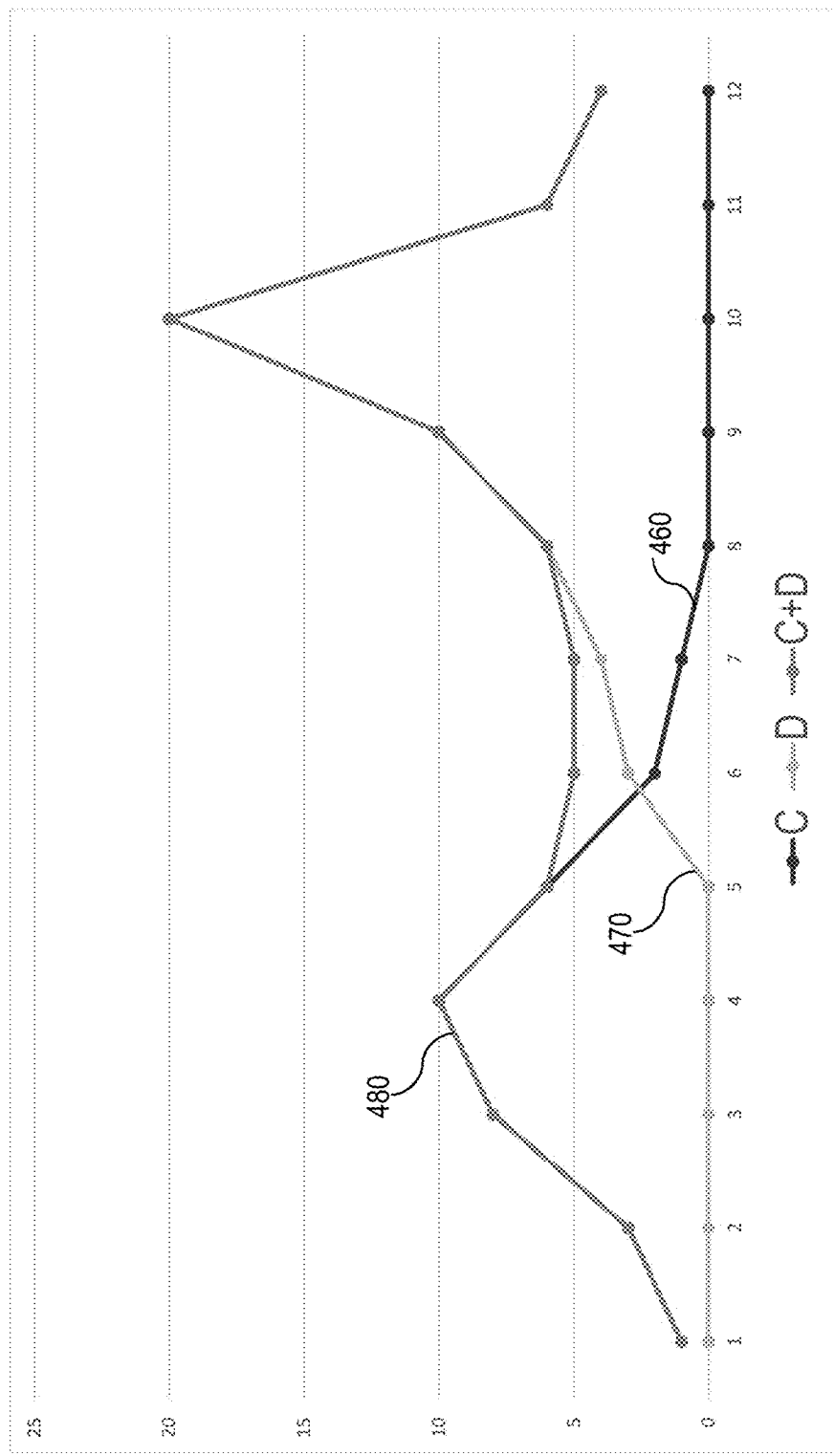
FIG. 3C illustrates a second example graph comprising known examples used for determining a positive example of a name replacement, in accordance with an embodiment of the invention.

FIG. 3C illustrates a second example graph 450 comprising known examples used for determining a positive example of a name replacement, in accordance with an embodiment of the invention. The graph 450 includes a first example time series model 460 for a single name "C", and a second example time series model 470 for a single name "D". Each time series model 460, 470 represents a known example. A time series model 480 representing a sum of the time series models 460 and 470 is also included in the graph 450.

As shown in FIG. 3C, the name "C" is known to be replaced with the name "D" over time, such that the first time series model 460 and the second time series model 470 represent a before time series model and an after time series model, respectively. Based on the time series models 460, 470, the generation unit 130 generates a candidate name replacement pair <"C", "D">, where "C" is the before name, and "D" is the after name. The candidate name replacement pair <"C", "D"> is a positive known example of a name replacement.

In one embodiment, the generation unit 130 may generate negative synthetic examples of name replacements based on two positive known examples of name replacements satisfying the following conditions: (1) the two positive known examples of name replacements have the same name change time (i.e., most recent/last appearance of a before name of each of the two positive known examples of name replacements occurs at the same time), and (2) the two positive known examples of name replacements have significantly different average values. For example, in one embodiment, average values for a first positive known example of a name replacement must differ in a pre-specified manner from a second positive known example of a name replacement (e.g., performance values for the first positive known example of a name replacement are uniformly at least 10% higher than performance values for the second known example of a name replacement).

Figure 3D:
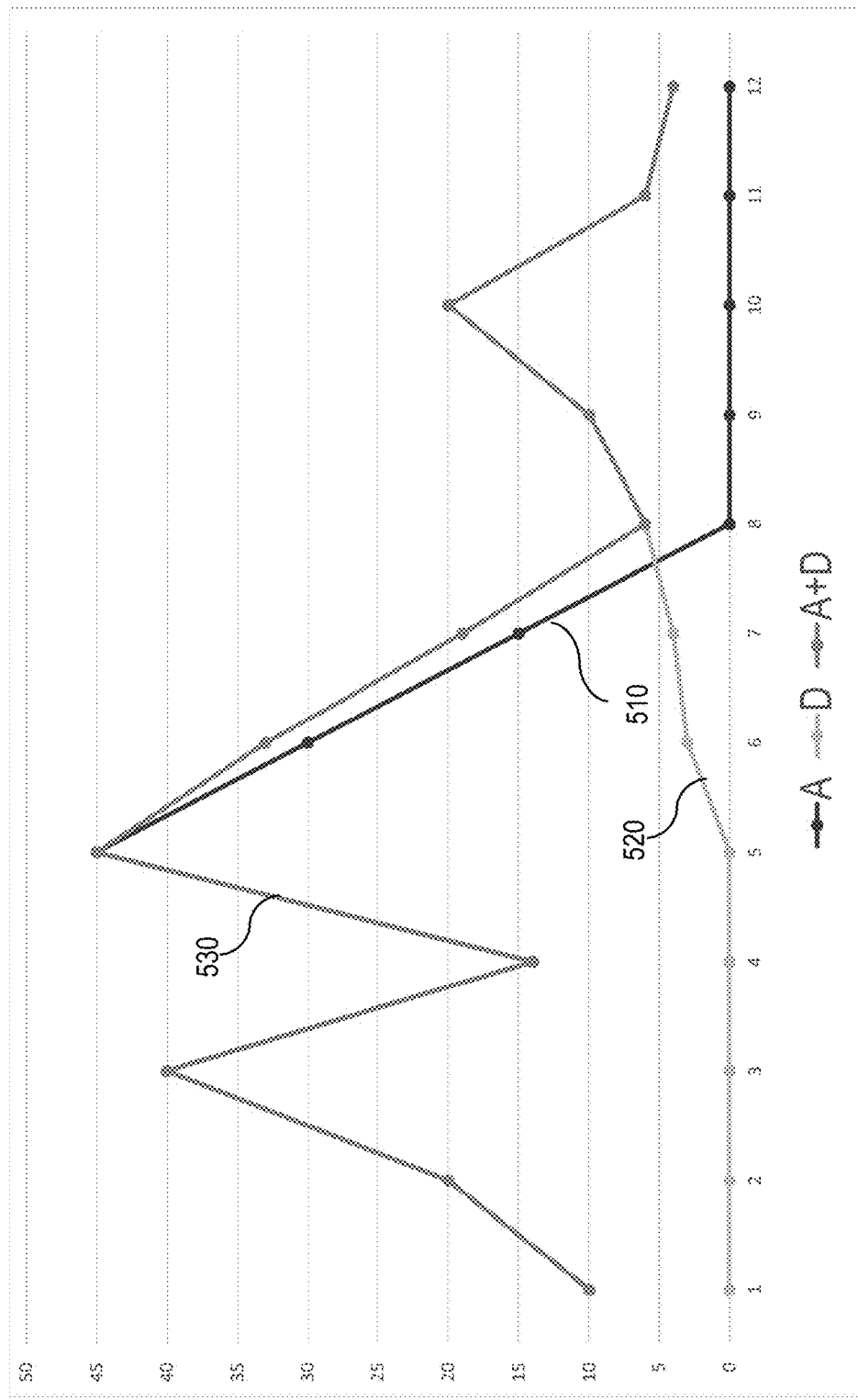
FIG. 3D illustrates a third example graph comprising positive known examples of name replacements used for determining a negative synthetic example of a name replacement, in accordance with an embodiment of the invention.

FIG. 3D illustrates a third example graph 500 comprising positive known examples of name replacements used for determining a negative synthetic example of a name replacement, in accordance with an embodiment of the invention. The graph 500 includes: (1) a first time series model 510 for the single name "A", the before name of the positive known example of a name replacement discussed above in reference to FIG. 3B, and (2) a second time series model 520 for the single name "D", the after name of the positive known example of a name replacement discussed above in reference to FIG. 3C. Each time series model 510, 520 represents a part of a positive known example of a name replacement. A time series model 530 representing a sum of the time series models 510 and 520 is also included in the graph 500.

As shown in FIGS. 3B-3C, the name "A" is known to be replaced with the name "B" over time, and the name "C" is known to be replaced with the name "D" over time. As such, "D" is not a replacement name for "A". The generation unit 130 generates a candidate name replacement pair <"A", "D"> that is a negative synthetic example of a name replacement.

Figure 3E:
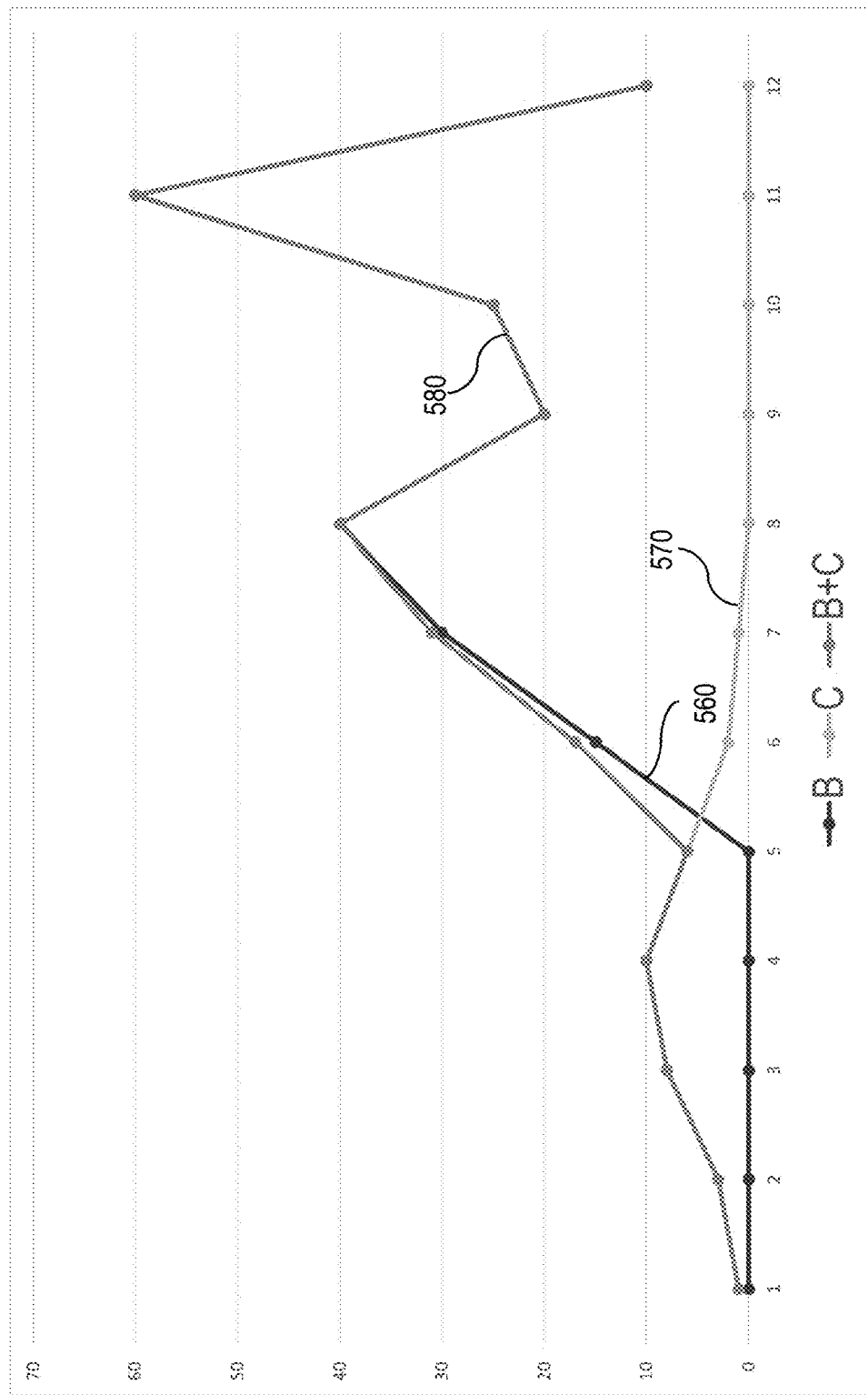
FIG. 3E illustrates a fourth example graph comprising positive known examples of name replacements used for determining a negative synthetic example of a name replacement, in accordance with an embodiment of the invention.

FIG. 3E illustrates a fourth example graph 550 comprising positive known examples of name replacements used for determining a negative synthetic example of a name replacement, in accordance with an embodiment of the invention. The graph 550 includes: (1) a first time series model 560 for the single name "B", the after name of the positive known example of a name replacement discussed above in reference to FIG. 3B, and (2) a second time series model 570 for a single name "C", the before name of the positive known example of a name replacement discussed above in reference to FIG. 3C. Each time series model 560, 570 represents a part of a positive known example of a name replacement. A time series model 580 representing a sum of the time series models 560 and 570 is also included in the graph 550.

As shown in FIGS. 3B-3C, the name "A" is known to be replaced with the name "B" over time, and the name "C" is known to be replaced with the name "D" over time. As such, "B" is not a replacement name for "C". The generation unit 130 generates a candidate name replacement pair <"C", "B"> that is a negative synthetic example of a name replacement.

In one embodiment, generating negative synthetic examples from positive known examples of name replacement with significantly different average values facilitates training of a machine learning classifier (e.g., the classifier unit 160).

Embodiments of the invention allow utilizing data associated with a possible name change to determine a window of time over which various statistics are obtained for classification to improve precision of a supervised machine learning classifier.

The window selection unit 140 is configured for selecting one or more windows of time within a time series model 50 based on one or more window selecting features and/or methods. For each candidate name replacement pair, each selected window of time must include time of latest appearance of a before name of the candidate name replacement pair based on a quantitative feature of a time series model 50 comprising performance data for both the before name and an after name of the candidate name replacement pair.

FIG. 4 illustrates an example window selecting feature and/or method, in accordance with an embodiment of the invention. In one embodiment, the window selection unit 140 may select a window of time that includes the following: (1) a closest peak data value or trough data value before time of most recent appearance of a before name (i.e., before time of the hypothetical or known name change), and (2) a closest peak data value or trough data value after time of most recent appearance of the before name. In another embodiment, the role of most recent appearance of the before name is replaced by the role of oldest appearance of the after name.

In one embodiment, a peak data value is a data value that satisfies each of the following conditions: (1) the peak data value is greater than a data value immediately preceding ("immediate predecessor") the peak data value, (2) the peak data value is no less than any data value of a sequence of neighboring data values of a pre-determined length immediately preceding the peak data value, and (3) the peak data value is no less than any data value of a sequence of neighboring data values of a pre-determined length immediately following the peak data value. In one embodiment, a trough data value is a data value that satisfies each of the following conditions: (1) the trough data value is less than a data value immediately preceding ("immediate predecessor") the trough data value, (2) the trough data value is no greater than any data value of a sequence of neighboring data values of a pre-determined length immediately preceding the trough data value, and (3) the trough data value is no greater than any data value of a sequence of neighboring data values of a pre-determined length immediately following the trough data value. If data values of a time series model 50 represents costs, a peak data value represents a peak cost and a trough data value represents a trough cost. In another embodiment the immediate predecessor is replaced by the immediate successor.

Another example of a window selecting feature and/or method the window selection unit 140 may apply includes selecting a window of time having a best linear fit using an $R^2$ statistic.

As stated above, for each candidate name replacement pair, each selected window of time must include time of latest appearance of a before name of the candidate name replacement pair based on a quantitative feature of a time series model 50 comprising performance data for both the before name and an after name of the candidate name replacement pair. Referring back to FIG. 2, the computation unit 150 is configured for computing one or more quantitative features of one or more time series models 50 at one or more levels of data aggregation.

An example level of data aggregation is contract level, where the contract level comprises each contract (e.g., a service performance contract) that includes a before name and an after name of a candidate name replacement pair. Another example level of data aggregation is country level, where the country level comprises an aggregate of all data in a country that includes either a before name or an after name of a candidate name replacement pair.

In one embodiment, the computation unit 150 may compute one or more quantitative features of different time series models 50 at multiple levels of data aggregation (e.g., contract level, country level) with multiple instances at the lowest level of data aggregation when available. For example, each time series model 50 may comprise performance data, within a selected window of time, for each of the following: (1) a before name of a candidate name replacement pair, (2) an after name of the candidate name replacement pair, and (3) a combination of the before name and the after name (e.g., before, after, and both). For each window selecting feature and/or method, the computation unit 150 computes one or more quantitative feature sets for known name replacements from multiples instances at multiple levels of data aggregation within one or more windows selected by the selection unit 140. Where multiple instances are involved at a given level of data aggregation, the computation unit 150 aggregates quantitative features for multiple instances into a quantitative feature set representing a set of aggregate features (e.g., minimum, maximum, and average). In one example implementation, the computation unit 150 presents the same number of quantitative features for each level of data aggregation that involves multiple instances.

In one example implementation, a fixed number of levels of data aggregation (e.g., two levels of data aggregation) are used instead, where the fixed number of levels of data aggregation include a top level that contains all other levels of data aggregation.

The classifier unit 160 is configured for classifying candidate name replacement pairs. In one embodiment, the classifier unit 160 is a machine learning classifier executing on a hardware processor. The classifier unit 160 classifiers candidate name replacement pairs using known supervised machine learning based on the quantitative features computed by the computation unit 150. Candidate name replacement pairs classified with high confidence are added to the inventory of known name replacements.

In one embodiment, the quantitative features used for classifying are combined from features computed from instances of the possible name change taken at more than one level of data aggregation.

In one embodiment, to train the classifier unit 160 (i.e., in a training stage), a sample of known name replacement pairs is obtained from performance data, positive and negative synthetic examples of name replacements are generated using the sample, and, for each of one or more window selecting features or methods, quantitative feature sets for the sample are computed from multiple instances at multiple levels of data aggregation within selected windows of time. The sample may include positive examples of name replacements and/or negative examples of name replacements. In one example implementation of the training stage, for each known name replacement pair included in the sample, a window of time for the known replacement pair that covers a most recent appearance of the before name of the known name replacement pair is determined based on quantitative features of a time series model comprising performance data for both the before name and the after name of the known name replacement pair. The classifier unit is then trained based on quantitative features computed using a portion of the performance data for the before name and the after name of the known name replacement pair (i.e., the portion of the performance data for the before name and the after name of the known name replacement pair that is within the window of time determined for the known replacement pair).

In a classification stage (i.e., after the training stage), the trained classifier unit 160 classifies candidate name replacement pairs, and add pairs classified with high confidence to inventory of known name replacements. In one example implementation of the classification stage, for each candidate name replacement pair, a window of time for the candidate name replacement pair that covers a most recent appearance of the before name of the candidate name replacement pair is determined based on quantitative features of a time series model comprising performance data for both the before name and the after name name of the candidate name replacement pair. The trained classifier unit 160 classifies the candidate name replacement pair based on quantitative features computed using a portion of the performance data for the before name and the after name of the candidate name replacement pair (i.e., the portion of the performance data for the before name and the after name of the candidate name replacement pair that is within the window of time determined for the candidate name replacement pair).

As stated above, the generation unit 130 may generate any number of synthetic examples at any level of data aggregation. FIGS. 5A-5D illustrate different schemas representing different levels of data aggregation. Each schema is a visual representation of a set of one or more aggregated dimensions associated with a service delivery project. Example dimensions associated with a service delivery project may include Date, Amount, Cost/Rev, Country, Industry, Client, Contract, Service, and Component.

For example, FIG. 5A illustrates a first example schema 700 for a service delivery project. The schema 700 shows aggregated data representing a fine level of data aggregation, where the aggregated data shown satisfies the following conditions: (1) all dimensions associated with the service delivery project are selected, and (2) data values for dimension Cost/Rev must equal "Cost".

FIG. 5B illustrates a second example schema 720 for a service delivery project. The schema 720 shows aggregated data representing a level of data aggregation, where the aggregated data shown satisfies the following conditions: (1) only dimensions Date and sum(Amount) are selected, (2) data values for dimension Cost/Rev must equal "Cost", and (3) the aggregated data is grouped by dimensions Date and Contract. As shown in FIG. 5B, the aggregated data is grouped into multiple separate groups, such as Group 1A including a first portion of the aggregated data where data values for dimension Contract is equal to "A111", Group 2A including a second portion of the aggregated data where data values for dimension Contract is equal to "A112", Group 3A including a third portion of the aggregated data where data values for dimension Contract is equal to "B101", and Group 4A including a fourth portion of the aggregated data where data values for the dimension Contract is equal to "B102".

FIG. 5C illustrates a third example schema 730 for a service delivery project. The schema 730 shows aggregated data representing a level of data aggregation, where the aggregated data shown satisfies the following conditions: (1) only dimensions Date, sum(Amount), Contract and Component are selected, (2) data values for dimension Cost/Rev must equal "Cost", and (3) the aggregated data is grouped by dimensions Date, Contract and Component. As shown in FIG. 5C, the aggregated data is grouped into multiple separate groups, such as Group 1B including a first portion of the aggregated data where data values for dimension Contract is equal to "A111" and dimension Component is equal to "19a", Group 2B including a second portion of the aggregated data where data values for dimension Contract is equal to "A111" and dimension Component is equal to "19b", Group 3B including a third portion of the aggregated data where data values for dimension Contract is equal to "A112" and dimension Component is equal to "19a", Group 4B including a fourth portion of the aggregated data where data values for dimension Contract is equal to "B101" and dimension Component is equal to "19a", and Group 5B including a fifth portion of the aggregated data where data values for dimension Contract is equal to "B101" and dimension Component is equal to "19b".

FIG. 5D illustrates a fourth example schema 740. The schema 740 shows aggregated data representing a level of data aggregation, where the aggregated data shown satisfies the following conditions: (1) only dimensions Date, sum (Amount), Country and Component are selected, (2) data values for dimension Cost/Rev must equal "Cost", and (3) the aggregated data is grouped by dimensions Date, Country and Component. As shown in FIG. 5D, the aggregated data is grouped into multiple separate groups, such as Group 1C including a first portion of the aggregated data where data values for dimension Country is equal to "D" and dimension Component is equal to "19a", Group 2C including a second portion of the aggregated data where data values for dimension Country is equal to "D" and dimension Component is equal to "19b", Group 3C including a third portion of the aggregated data where data values for dimension Country is equal to "E" and dimension Component is equal to "19a", and Group 4C including a fourth portion of the aggregated data where data values for dimension Country is equal to "E" and dimension Component is equal to "19b".

Figure 6:
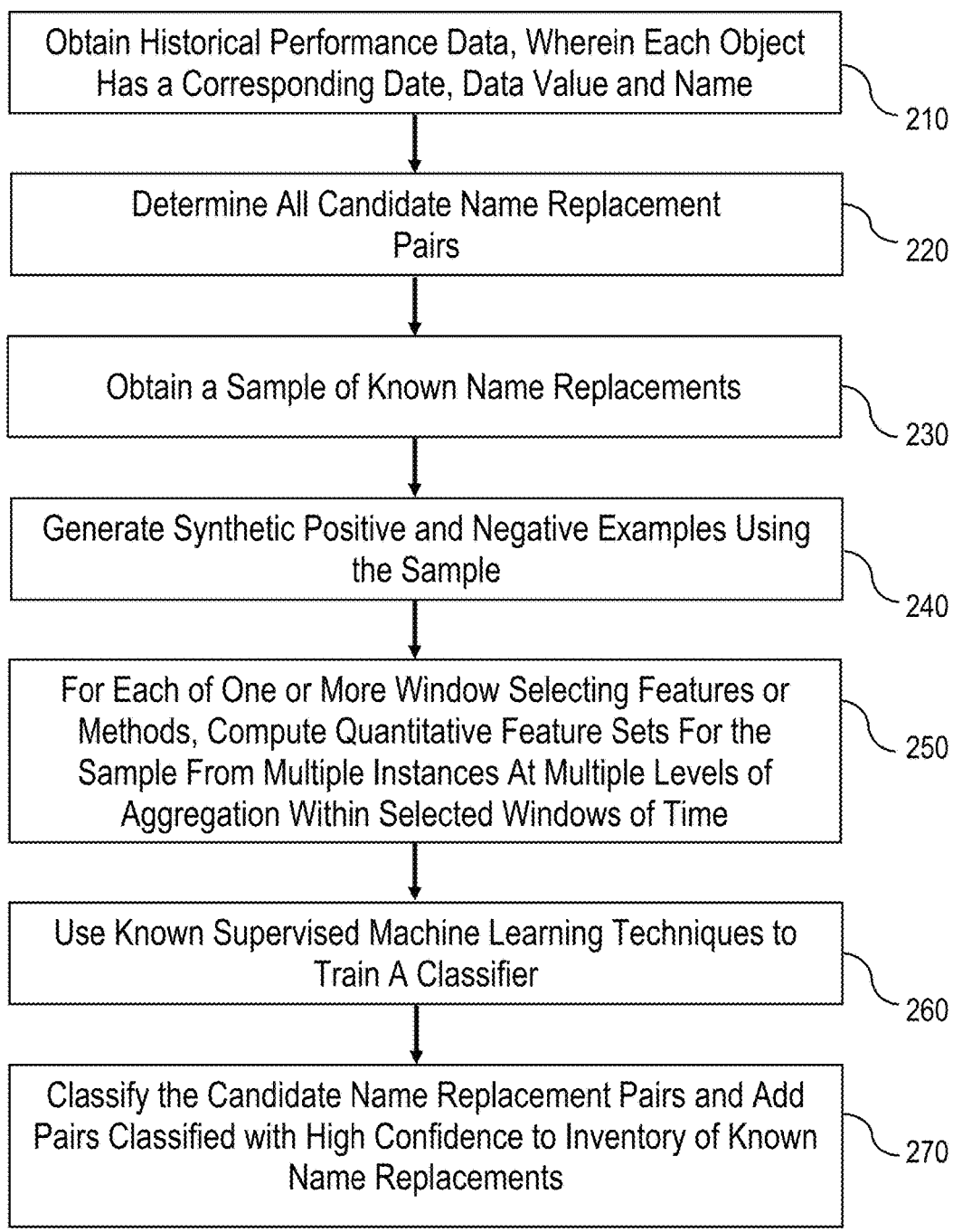
FIG. 6 illustrates a flowchart of an example process for quantitative discovery of name changes, in accordance with an embodiment of the present invention.

FIG. 6 illustrates a flowchart of an example process 200 for automatic quantitative discovery of name changes, in accordance with an embodiment of the present invention. In process block 210, obtain historical performance data, where each object has a corresponding date, data value and name. In process block 220, determine all candidate name replacement pairs. In process block 230, obtain a sample of known name replacements. In process block 240, generate positive and negative synthetic examples of name replacements using the sample. In process block 250, for each of one or more window selecting features or methods, compute quantitative feature sets for the sample from multiple instances at multiple levels of data aggregation within selected windows of time. In process block 260, use known supervised machine learning techniques to train a classifier. In process block 270, classify the candidate name replacement pairs and add pairs classified with high confidence to inventory of known name replacements. If there are any candidate name replacement pairs that are unclassified, return to process block 240.

In one embodiment, process block 210 may be executed utilizing the performance data storage unit 110. In one embodiment, process block 220 may be executed utilizing the determination unit 120. In one embodiment, process blocks 230 and 240 may be executed utilizing the generation unit 130. In one embodiment, process block 250 may be executed utilizing the window selection unit 140. In one embodiment, process blocks 260 and 270 may be executed utilizing the classifier unit 160.

Embodiments of the invention may be applied in the field of financial analytics to provide methods to solve many problems in providing business insight from ledger data. Example problems that embodiments of the invention may solve include modeling of ledger behavior of long running service offerings, determining when one contract represents a partial continuation of another and determining the continuing versus new parts. Long running models of parts of contracts are needed to predict contract related behavior such as early termination to predict profitability to cross sell services effectively.

FIG. 7 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   maintaining, on a storage device, historical performance data for one or more contracts, wherein the historical performance data comprises a date, a data value and a name for the one or more contracts;
   classifying, on at least one hardware processor, a name replacement pair as a name change, wherein each name replacement pair comprises a pair of names, each name change represents a change in descriptor that does not affect a behavior of the one or more contracts, the classifying comprises:
   obtaining a sample of known name replacement pairs included in the historical performance data, wherein each known name replacement pair included in the sample is a known name change;
   for each known name replacement pair included in the sample:
   based on a first set of quantitative features of a first time series model included in the historical performance data and comprising performance data for a first name and a second name of the known name replacement pair, determining a first window of time for the known replacement pair that covers a most recent appearance of the first name of the known name replacement pair, wherein the known name replacement pair is one of a positive example or a negative example of a name change; and
   training a machine learning classifier based on a second set of quantitative features computed using a portion of the first time series model that is within the first window of time;
   generating, on the at least one hardware processor, a first predicted name replacement pair based on a first known name replacement pair of the sample and a second known name replacement pair of the sample, wherein the first known replacement pair and the second known replacement pair are known name changes that occur at the same time, and an average of first performance data for the first known replacement pair differs from an average of second performance data for the second known replacement pair;
   applying the trained machine learning classifier to the first predicted name replacement pair; and
   adding the first predicted name replacement pair to the sample of known name replacement pairs in response to the trained machine learning classifier classifying the first predicted name replacement pair as a name change; and
   based on the sample of known name replacement pairs, detecting a name change in the historical performance data, and identifying data included in the historical performance data and associated with the name change as a continuation of a contract instead of a start of a different contract, wherein one or more long running models of the one or more contracts for use in predicting one or more behaviors related to the one or more contracts are constructed based on the data identified.

2. The method of claim 1, wherein applying the trained machine learning classifier to the first predicted name replacement pair comprises:
   based on a third set of quantitative features of a second time series model included in the historical performance data and comprising performance data for a first name and a second name of the first predicted name replacement pair, determining a second window of time for the first predicted name replacement pair that covers a most recent appearance of the first name of the first predicted name replacement pair; and
   applying the trained machine learning classifier to classify the first predicted name replacement pair based on a fourth set of quantitative features computed using a portion of the second time series model that is within the second window of time.

3. The method of claim 2, wherein the fourth set of quantitative features are combined from features computed from instances of possible name changes determined at more than one level of data aggregation.

4. The method of claim 2, wherein each window of time for each name replacement pair is determined by searching for peak data values or trough data values closest to a most recent appearance of a first name of the name replacement pair.

5. The method of claim 1, wherein the one or more contracts comprise one or more service delivery contracts.

6. The method of claim 5, further comprising:
   constructing a long running model of service delivery performance based on the historical performance data and the sample of known name replacement pairs by identifying data included in the historical performance data and associated with a name change detected in the historical performance data as a continuation of a service delivery contract instead of a start of a different service delivery contract.

7. The method of claim 1, further comprising:
   generating a second predicted name replacement pair that is a synthetic positive example of a name change by:
   randomly selecting a point along a second time series model included in the historical performance data and comprising performance data for a single name only; and generating the second predicted name replacement pair based on the selected point, wherein the second predicted name replacement pair includes a first name that covers a portion of the second time series model including the selected point and points occurring before the selected point, and a second name that covers a remaining portion of the second time series model including points occurring after the selected point.

8. The method of claim 1, wherein:
the first predicted name replacement pair is a synthetic negative example of a name change;
the first known name replacement pair represents a first positive example of a name change involving a first name of the first known name replacement pair replaced over time by a second name of the first known name replacement pair;
the second known name replacement pair represents a second positive example of a name change involving a first name of the second known name replacement pair replaced over time by a second name of the second known name replacement pair;
the average of the first performance data for the first known name replacement pair is at least ten percent higher than the average of the second performance data for the second known name replacement pair;
a most recent appearance of the first name of the first known name replacement pair occurs at the same time as a most recent appearance of the first name of the second known name replacement pair; and
the first predicted name replacement pair generated includes a part of the first name of the first known name replacement pair and a part of the second name of the second known name replacement pair.

9. A system comprising:
a memory having computer readable computer instructions; and
a processor for executing the computer readable instructions, the instructions including:
maintaining historical performance data for one or more contracts, wherein the historical performance data comprises a date, a data value and a name for the one or more contracts;
classifying a name replacement pair as a name change, wherein each name replacement pair comprises a pair of names, each name change represents a change in descriptor that does not affect a behavior of the one or more contracts, the classifying comprises:
obtaining a sample of known name replacement pairs included in the historical performance data, wherein each known name replacement pair included in the sample is a known name change;
for each known name replacement pair included in the sample:
based on a first set of quantitative features of a first time series model included in the historical performance data and comprising performance data for a first name and a second name of the known name replacement pair, determining a first window of time for the known replacement pair that covers a most recent appearance of the first name of the known name replacement pair, wherein the known name replacement pair is one of a positive example or a negative example of a name change; and
training a machine learning classifier based on a second set of quantitative features computed using a portion of the first time series model that is within the first window of time;
generating a first predicted name replacement pair based on a first known name replacement pair of the sample and a second known name replacement pair of the sample, wherein the first known replacement pair and the second known replacement pair are known name changes that occur at the same time, and an average of first performance data for the first known replacement pair differs from an average of second performance data for the second known replacement pair;
applying the trained machine learning classifier to the first predicted name replacement pair; and
adding the first predicted name replacement pair to the sample of known name replacement pairs in response to the trained machine learning classifier classifying the first predicted name replacement pair as a name change; and
based on the sample of known name replacement pairs, detecting a name change in the historical performance data, and identifying data included in the historical performance data and associated with the name change as a continuation of a contract instead of a start of a different contract, wherein one or more long running models of the one or more contracts for use in predicting one or more behaviors related to the one or more contracts are constructed based on the data identified.

10. The system of claim 9, wherein applying the trained machine learning classifier to the first predicted name replacement pair comprises:
based on a third set of quantitative features of a second time series model included in the historical performance data and comprising performance data for a first name and a second name of the first predicted name replacement pair, determining a second window of time for the first predicted name replacement pair that covers a most recent appearance of the first name of the first predicted name replacement pair; and
applying the trained machine learning classifier to classify the first predicted name replacement pair based on a fourth set of quantitative features computed using a portion of the second time series model that is within the second window of time.

11. The system of claim 10, wherein the fourth set of quantitative features are combined from features computed from instances of possible name changes determined at more than one level of data aggregation.

12. The system of claim 10, wherein each window of time for each name replacement pair is determined by searching for peak data values or trough data values closest to a most recent appearance of a first name of the name replacement pair.

13. The system of claim 9, wherein the one or more contracts comprise one or more service delivery contracts.

14. The system of claim 13, the instructions further including:
constructing a long running model of service delivery performance based on the historical performance data and the sample of known name replacement pairs by identifying data included in the historical performance data and associated with a name change detected in the historical performance data as a continuation of a service delivery contract instead of a start of a different service delivery contract.

15. The system of claim 9, the instructions further including:
  generating a second predicted name replacement pair that is a synthetic positive example of a name change by:
    randomly selecting a point along a second time series model included in the historical performance data and comprising performance data for a single name only; and
    generating the second predicted name replacement pair based on the selected point, wherein the second predicted name replacement pair includes a first name that covers a portion of the second time series model including the selected point and points occurring before the selected point, and a second name that covers a remaining portion of the second time series model including points occurring after the selected point.

16. The system of claim 9, wherein:
  the first predicted name replacement pair is a synthetic negative example of a name change;
  the first known name replacement pair represents a first positive example of a name change involving a first name of the first known name replacement pair replaced over time by a second name of the first known name replacement pair;
  the second known name replacement pair represents a second positive example of a name change involving a first name of the second known name replacement pair replaced over time by a second name of the second known name replacement pair;
  the average of the first performance data for the first known name replacement pair is at least ten percent higher than the average of the second performance data for the second known name replacement pair;
  a most recent appearance of the first name of the first known name replacement pair occurs at the same time as a most recent appearance of the first name of the second known name replacement pair; and
  the first predicted name replacement pair generated includes a part of the first name of the first known name replacement pair and a part of the second name of the second known name replacement pair.

17. A computer program product comprising a computer readable storage medium having program code embodied therewith, the program code is executable by a processor to:
  maintain historical performance data for one or more contracts, wherein the historical performance data comprises a date, a data value and a name for the one or more contracts;
  classifying a name replacement pair as a name change, wherein each name replacement pair comprises a pair of names, each name change represents a change in descriptor that does not affect a behavior of the one or more contracts, the classifying comprises:
    obtaining a sample of known name replacement pairs included in the historical performance data, wherein each known name replacement pair included in the sample is a known name change;
    for each known name replacement pair included in the sample:
      based on a first set of quantitative features of a first time series model included in the historical performance data and comprising performance data for a first name and a second name of the known name replacement pair, determining a first window of time for the known replacement pair that covers a most recent appearance of the first name of the known name replacement pair, wherein the known name replacement pair is one of a positive example or a negative example of a name change; and
      training a machine learning classifier based on a second set of quantitative features computed using a portion of the first time series model that is within the first window of time;
    generating, on the at least one hardware processor, a first predicted name replacement pair based on a first known name replacement pair of the sample and a second known name replacement pair of the sample, wherein the first known replacement pair and the second known replacement pair are known name changes that occur at the same time, and an average of first performance data for the first known replacement pair differs from an average of second performance data for the second known replacement pair;
    applying the trained machine learning classifier to the first predicted name replacement pair; and
    adding the first predicted name replacement pair to the sample of known name replacement pairs in response to the trained machine learning classifier classifying the first predicted name replacement pair as a name change; and
  based on the sample of known name replacement pairs, detect a name change in the historical performance data, and identify data included in the historical performance data and associated with the name change as a continuation of a contract instead of a start of a different contract, wherein one or more long running models of the one or more contracts for use in predicting one or more behaviors related to the one or more contracts are constructed based on the data identified.

18. The program product of claim 17, wherein applying the trained machine learning classifier to the first predicted name replacement pair comprises:
  based on a third set of quantitative features of a second time series model included in the historical performance data and comprising performance data for a first name and a second name of the first predicted name replacement pair, determining a second window of time for the first predicted name replacement pair that covers a most recent appearance of the first name of the first predicted name replacement pair; and
  applying the trained machine learning classifier to classify the first predicted name replacement pair based on a fourth set of quantitative features computed using a portion of the second time series model that is within the second window of time.

19. The program product of claim 18, wherein the fourth set of quantitative features are combined from features computed from instances of possible name changes determined at more than one level of data aggregation.

20. The program product of claim 18, wherein each window of time for each name replacement pair is determined by searching for peak data values or trough data values closest to a most recent appearance of a first name of the name replacement pair.

* * * * *